United States Patent
Tomlin (10) Patent No.: US 10,540,219 B2
(45) Date of Patent: Jan. 21, 2020

(54) RESET AND ERROR HANDLING IN APPLICATION SPECIFIC INTEGRATED CIRCUITS

(71) Applicant: Toshiba Memory Corporation, Minato-ku, Tokyo (JP)

(72) Inventor: Andrew John Tomlin, San Jose, CA (US)

(73) Assignee: Toshiba Memory Corporation, Tokyo (JP)

( * ) Notice: Subject to any disclaimer, the term of this patent is extended or adjusted under 35 U.S.C. 154(b) by 122 days.

(21) Appl. No.: 15/918,539

(22) Filed: Mar. 12, 2018

(65) Prior Publication Data

US 2019/0079817 A1    Mar. 14, 2019

Related U.S. Application Data

(63) Continuation-in-part of application No. 15/702,853, filed on Sep. 13, 2017.

(51) Int. Cl.
*G06F 11/00* (2006.01)
*G06F 11/07* (2006.01)
*G06F 11/14* (2006.01)

(52) U.S. Cl.
CPC ........ *G06F 11/073* (2013.01); *G06F 11/1441* (2013.01)

(58) Field of Classification Search
CPC .... G06F 3/0659; G06F 11/00; G06F 11/0793; G06F 11/3055; G06F 12/0891; G06F 9/3865; G06F 9/4881; G06F 9/5011; H04L 49/90; H04L 51/30
See application file for complete search history.

(56) References Cited

U.S. PATENT DOCUMENTS

| | | | | |
|---|---|---|---|---|
| 5,278,984 A | * | 1/1994 | Batchelor | H04L 51/26 |
| | | | | 719/314 |
| 5,687,390 A | * | 11/1997 | McMillan, Jr. | G06F 3/0601 |
| | | | | 710/5 |
| 6,829,697 B1 | * | 12/2004 | Davis | G06F 15/7864 |
| | | | | 712/21 |
| 7,151,744 B2 | | 12/2006 | Sarkinen et al. | |

(Continued)

OTHER PUBLICATIONS

Extended European Search Report corresponding to European Patent Application No. 18 19 0922.7 dated Feb. 13, 2019.

*Primary Examiner* — Loan L. T. Truong (74) *Attorney, Agent, or Firm* — White & Case LLP (57) ABSTRACT

In one embodiment, a method for reset and error handling comprises identifying at least one queue of a plurality of queues that is subject to a reset, halting fetching of commands from a host that are associated with the at least one queue subject to the reset, halting reallocation of command identifiers of completed commands to commands received from the host that are associated with the plurality of queues, identifying at least one command identifier associated with the at least one queue subject to the reset, updating an error state bitmap to indicate the at least one command identifier as a command in error, resuming reallocation of command identifiers of completed commands after updating the error state bitmap, and resuming fetching of commands from the host that are associated with the at least one queue subject to the reset after resuming reallocation of command identifiers of completed commands.

20 Claims, 10 Drawing Sheets

(56) References Cited

U.S. PATENT DOCUMENTS

| | | |
|---|---|---|
| 7,308,700 B1 | 12/2007 | Fung et al. |
| 7,720,928 B2 | 5/2010 | Reuter et al. |
| 7,739,556 B1 | 6/2010 | Duluk, Jr. et al. |
| 7,756,053 B2 | 7/2010 | Thomas et al. |
| 7,849,259 B1* | 12/2010 | Wong ................. G06F 3/061 710/53 |
| 8,095,829 B1 | 1/2012 | Coon et al. |
| 8,351,426 B2* | 1/2013 | Cadigan, Jr. ........ H04L 47/13 370/389 |
| 8,713,357 B1 | 4/2014 | Jean et al. |
| 9,015,533 B1 | 4/2015 | Fateev |
| 9,497,025 B2* | 11/2016 | Alsup ................. H04L 49/25 |
| 10,061,780 B2* | 8/2018 | Kalal ................. G06F 16/183 |
| 10,102,084 B1* | 10/2018 | Reynolds ........... G06F 11/1004 |
| 10,210,095 B2* | 2/2019 | Bubb .................. G06F 12/10 |
| 10,216,668 B2* | 2/2019 | Wang ................. G06F 13/36 |
| 2002/0156894 A1* | 10/2002 | Suorsa ................ G06F 8/61 709/226 |
| 2008/0141256 A1* | 6/2008 | Forrer, Jr. ............ G06F 3/061 718/103 |
| 2008/0148282 A1* | 6/2008 | Sodani ................ G06F 9/3857 719/314 |
| 2010/0228706 A1* | 9/2010 | Labuda ............... G06F 16/2379 707/700 |
| 2012/0239973 A1 | 9/2012 | Walton et al. |
| 2013/0091388 A1* | 4/2013 | Gygi ................... G06F 11/366 714/39 |
| 2013/0159764 A1* | 6/2013 | Adar ................... G06F 11/0745 714/5.1 |
| 2015/0089287 A1 | 3/2015 | Jayakumar et al. |
| 2015/0186068 A1* | 7/2015 | Benisty .............. G06F 3/0673 711/154 |
| 2015/0212738 A1 | 7/2015 | D'Eliseo et al. |
| 2015/0234601 A1* | 8/2015 | Tsai .................... G06F 3/0611 711/103 |
| 2015/0254121 A1 | 9/2015 | Anderson et al. |
| 2016/0248628 A1* | 8/2016 | Pandit ................ H04L 41/0806 |
| 2016/0371034 A1* | 12/2016 | Kang .................. G06F 3/0656 |
| 2017/0177247 A1* | 6/2017 | Hu ...................... G06F 3/061 |
| 2017/0286337 A1* | 10/2017 | Wang ................. G06F 13/36 |
| 2018/0063100 A1 | 3/2018 | Peeters et al. |
| 2018/0300064 A1* | 10/2018 | McGlaughlin ..... G06F 13/4282 |
| 2018/0314657 A1* | 11/2018 | Chen .................. G06F 13/32 |
| 2019/0012269 A1* | 1/2019 | Bubb .................. G06F 12/10 |
| 2019/0079817 A1* | 3/2019 | Tomlin ............... G06F 11/1441 |
| 2019/0079824 A1* | 3/2019 | Tomlin ............... G06F 11/0784 |

* cited by examiner

RESET AND ERROR HANDLING IN APPLICATION SPECIFIC INTEGRATED CIRCUITS

CROSS-REFERENCE TO RELATED APPLICATION

This application is a continuation-in-part of U.S. patent application Ser. No. 15/702,853, entitled "Centralized Error Handling in Application Specific Integrated Circuits," filed on Sep. 13, 2017, the subject matter of which is hereby incorporated by reference in its entirety.

FIELD OF THE INVENTION

The invention relates generally to application specific integrated circuits and more specifically to reset and error handling in application specific integrated circuits.

BACKGROUND OF THE INVENTION

Modern application specific integrated circuits (ASICs) such as System-on-Chip (SoC) devices commonly need to operate at very high data rates. To achieve such high speed operation ASIC designs often include sophisticated hardware automation in addition to firmware running on a processor. One example of an ASIC with a high level of hardware automation is a memory controller in a non-volatile solid-state memory drive. In devices with a high level of hardware automation, errors in executing commands from an external host should be handled in a manner such that the command in error has limited to no impact on other commands. Common error handling schemes involve interrupts sent to the device's firmware and halting operation of the hardware block experiencing the error, or passing errors between hardware blocks, which results in significant complexity in the ASIC design. Such error handling schemes also create opportunities for one hardware block experiencing an error in a command to "back pressure" other hardware blocks involved in executing tasks associated with that same command. For example, if a hardware block halts operation because of a command that experienced an error, completion of all other commands that require a task to be completed by that hardware block will be delayed until the error is cleared, causing a latency spike.

Typically, each hardware block that experiences an error will be held in an "error state" until the error is cleared by the firmware. If two hardware blocks are in an error state at the same time, both of those hardware blocks will cause back pressure in the system, a multi-error corner case. Error handling schemes designed to deal with such corner cases add significant complexity to both the system's hardware and firmware. This complexity requires significant verification tests of the system's design before manufacturing, which can delay the time to market for the system.

A reset in an ASIC commonly involves aborting or erroring out one or more commands. A reset can occur in response to a command or signal from a host, a power loss, or a decision by the ASIC's firmware. A full system reset involves aborting all commands currently active in the ASIC, and lower level resets such a sub-system reset typically involve aborting a significant number of commands. For example, a reset of a virtual controller in a solid state storage drive may involve aborting all commands in one or more queues associated with that virtual controller, which can affect multiple hardware blocks simultaneously. Resetting a queue by aborting or erroring out all of the commands in that queue ideally should not interfere with the processing of other commands, but multiple hardware blocks handling multiple commands in error can cause back pressure in the system. Thus there is a long-felt need for an improved technique for reset and error handling in ASICs.

BRIEF DESCRIPTION OF THE INVENTION

In one embodiment, a method for reset and error handling comprises identifying at least one queue of a plurality of queues that is subject to a reset, halting fetching of commands from a host that are associated with the at least one queue subject to the reset, halting reallocation of command identifiers of completed commands to commands received from the host that are associated with the plurality of queues, identifying at least one command identifier associated with the at least one queue subject to the reset, updating an error state bitmap to indicate the at least one command identifier as a command in error, resuming reallocation of command identifiers of completed commands after updating the error state bitmap, and resuming fetching of commands from the host that are associated with the at least one queue subject to the reset after resuming reallocation of command identifiers of completed commands. In one embodiment, the method further comprises identifying at least one resource associated with the at least one command identifier in at least one of a plurality of hardware blocks, and causing the at least one of the plurality of hardware blocks to release the at least one resource associated with the at least one command identifier. In one embodiment, the method further comprises updating the error state bitmap to indicate the at least one command identifier as command not in error when the at least one resource associated with the at least one command identifier has been released. In one embodiment, halting reallocation of command identifiers of completed commands to commands received from host that are associated with the plurality of queues comprises setting a flag in a command processor, and resuming reallocation of command identifiers of completed commands to commands received from the host that are associated with the plurality of queues comprises clearing the flag in the command processor.

In one embodiment, the method further comprises setting a queue error state bit corresponding to a queue identifier of the at least one queue subject to the reset in a queue error state bitmap as queue in error prior to halting allocation of command identifiers, and setting the queue error state bit in the queue error state bitmap corresponding to the queue identifier of the at least one queue subject to the reset as queue not in error after resuming allocation of command identifiers. In one embodiment, the method further comprises reporting an error state of a command in response to a query from one of a plurality of hardware blocks, if the error state of the command is command in error, disregarding a request associated with the command by the one of the plurality of hardware blocks, and if the error state of the command is command not in error, performing a function in response to the request associated with the command by the one of the plurality of hardware blocks.

In one embodiment, a system for reset and error handling comprises a plurality of hardware blocks, each of the plurality of hardware blocks configured to perform a function in response to a request associated with a command, a queue pointer configured to control fetching of commands from a host, each command being associated with one of a plurality of queues, a command processor configured to allocate command identifiers to the commands received from the host that are associated with the plurality of queues and firmware configured to identify at least one queue of the plurality of queues that is subject to a reset, cause the queue pointer to halt fetching of commands associated with the at least one queue subject to the reset, cause the command processor to halt reallocation of command identifiers of completed commands to commands associated with the plurality of queues, identify a command identifier of at least one command associated with the at least one queue subject to the reset update an error state bitmap to indicate the at least one command associated with the at least one queue as a command in error, cause the command processor to resume reallocating command identifiers of completed commands after updating the error state bitmap, and cause the queue pointer to resume fetching of commands from the host that are associated with the at least one queue subject to the reset after causing the command processor to resume reallocation of command identifiers of completed commands. In one embodiment, the command processor includes a queue error state bitmap, the queue error state bitmap storing a queue error state bit for each of a plurality of queue identifiers, the queue error state bit indicating either queue in error or queue not in error, and wherein the firmware is further configured to cause the command processor to set the queue error state bit for the at least one queue subject to the reset as queue in error.

In one embodiment, the system further comprises an error state manager that includes the error state bitmap, and wherein the firmware is configured to update the error state bitmap by setting an error state bit for the at least one command identifier in the error state bitmap to indicate command in error. In one embodiment, each of the plurality of hardware blocks is configured to send a query to the error state manager to determine the error state of a command prior to performing a function in response to a request associated with the command. In one embodiment, each of the plurality of hardware blocks is configured to disregard a request to perform a function associated with a command in error. In one embodiment, the system further comprises an error queue manager configured to receive an error message from at least one of the plurality of hardware blocks and store the error message in an error queue, the error message including a command identifier of a command in error.

In one embodiment, the firmware is further configured to identify a resource in at least one of the plurality of hardware blocks allocated to a request including the command identifier of the at least one command associated with the at least one queue subject to the reset. In one embodiment, the firmware is further configured to instruct the at least one of the plurality of hardware blocks to release the resource allocated to the request including the command identifier of the at least one command associated with the at least one queue subject to the reset. In one embodiment, the firmware is further configured to update the error state bitmap for the command identifier of the at least one command associated with the at least one queue subject to the reset as command not in error when all resources allocated to the at least one command in the plurality of hardware blocks have been released. In one embodiment, the firmware is configured to identify the at least one queue subject to the reset in response to a reset command from the host.

DETAILED DESCRIPTION OF THE INVENTION

Figure 1:
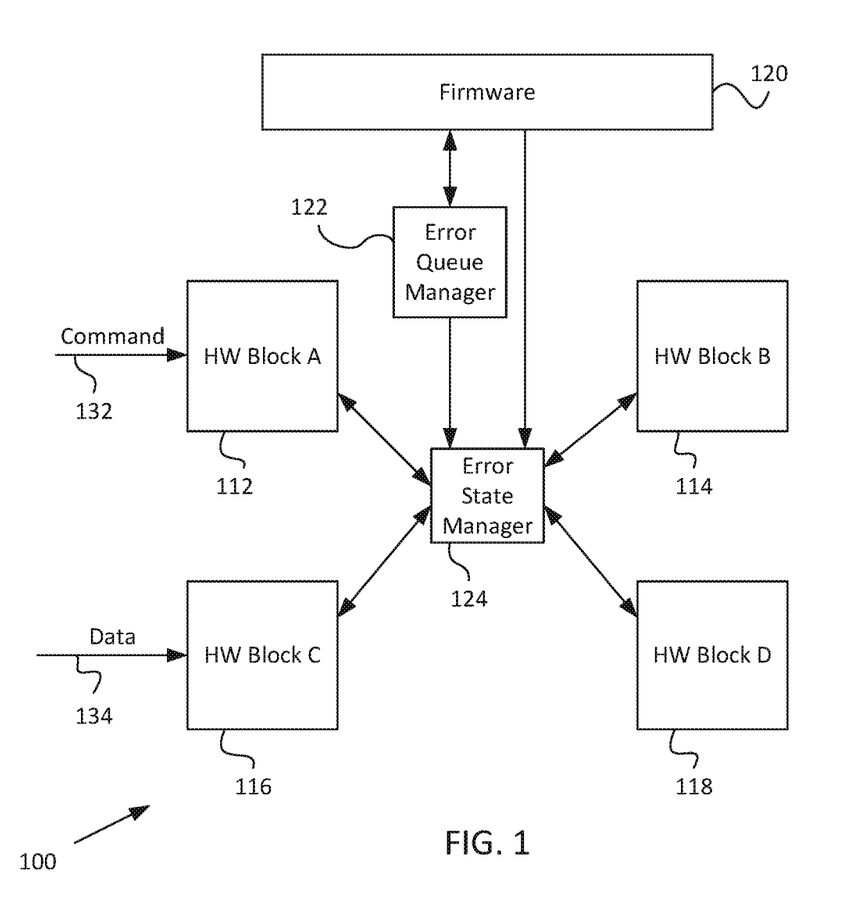
FIG. 1 is a diagram of an application specific integrated circuit with centralized error handling, according to one embodiment.

FIG. 1 is a diagram of an application specific integrated circuit (ASIC) 100 with centralized error handing, according to one embodiment. ASIC 100 comprises, but is not limited to, a hardware block A 112, a hardware block B 114, a hardware block C 116, a hardware block D 118, firmware 120, an error queue manager 122, and an error state manager 124. ASIC 100 includes a command path 132 for commands and command-related requests exchanged between hardware blocks and a data path 134 for data exchanged between hardware blocks. All of the communication paths between blocks in ASIC 100 are not shown in FIG. 1 for ease of illustration. Firmware 120 is executable code stored in a memory (not shown) that is executed by a processing unit (not shown) in conjunction with a volatile memory (not shown). Each of hardware block A 112, hardware block B 114, hardware block C 116, and hardware block D 118 is a hardware state machine that performs a specific task or function, for example direct memory access, queuing commands, or error correction coding. Four hardware blocks 112, 114, 116, and 118 are shown in FIG. 1 for ease of illustration; an ASIC 100 including any number of hardware blocks is within the scope of the invention. In addition, error queue manager 122 and error state manager 124 may be implemented as hardware state machines.

Each of hardware block A 112, hardware block B 114, hardware block C 116, and hardware block D 118 performs a task or function in response to requests associated with a command identifier for a command from a host system (not shown). If one of the hardware blocks, for example hardware block C 116, experiences an error in handling a request, hardware block C 116 reports the error to error queue manager 122 by sending an error message. The error message includes a block identifier for hardware block C 116, the command identifier to identify the command associated with the request that experienced the error (i.e., the errored command), and any other appropriate information related to the error. After sending the error message to error queue manager 122, hardware block C 116 releases all state related to the errored command and begins handling the next request. By including all information related to an error in an error message to error queue manager 122, releasing all state associated with a command in error, and then proceeding with a next request, none of hardware block A 112, hardware block B 114, hardware block C 116, and hardware block D 118 "back pressures" any other hardware block in ASIC 100 by delaying handling of requests associated with other commands.

Error queue manager 122 sends an interrupt to firmware 120 when error queue manager 122 moves an error message into the top (the head) of the error queue. Error queue manager 122 sends a "command in error" state message to error state manager 124 that causes error state manager 124 to set an error state for that command identifier in an error state bitmap as being in error. In another embodiment, the hardware block experiencing the error, for example hardware block C 116, sends a "command in error" state message to error state manager 124 that causes error state manager 124 to set an error state for that command identifier as being in error in the error state bitmap. Firmware 120 retrieves error information from error queue manager 122 and identifies the command that is in error. Firmware 120 then performs a "cleanup" process to identify and release resources in other hardware blocks related to executing the errored command. For example, hardware block A 112 may have resources such as registers storing state information for a request related to the command that experienced an error in hardware block C 116. Firmware 120 will instruct hardware block A 112 to release any resources allocated to processing a request associated with the errored command. The released resources are then available for use in handling requests associated with other commands that are not in error. When the "cleanup" process is complete, firmware 120 sends a "clear error" message to error state manager 124 to set the error state of the command identifier as being not in error.

The error state bitmap in error state manager 124 includes an error state bit for each command identifier that can be assigned to a command in ASIC 100. When a hardware block, for example hardware block A 112, receives a request to perform a task from firmware 120 or another hardware block on a functional interface, hardware block A 112 first checks the error state for the command identifier associated with that request by sending a query to error state manager 124. If error state manager 124 responds with a message that the command is in error, hardware block A 112 ignores or disregards the request associated with the command and moves on to query the error state of the next request it receives. By identifying a command as being in error, error state manager 124 prevents requests or sub-commands associated with the command from being executed by the hardware blocks. If error state manager 124 responds with a message that the command is not in error, the hardware block A 112 handles the request. By checking the error state for the command associated with every incoming request on its functional interface before attempting to handle the request, and dropping requests associated with commands reported as being in error by error state manager 124, each of hardware block A 112, hardware block B 114, hardware block C 116, and hardware block D 118 avoids becoming "infected" with a command that previously experienced an error in another hardware block. Thus none of hardware block A 112, hardware block B 114, hardware block C 116, and hardware block D 118 wastes resources handling requests associated with a command reported to be in error.

Figure 2:
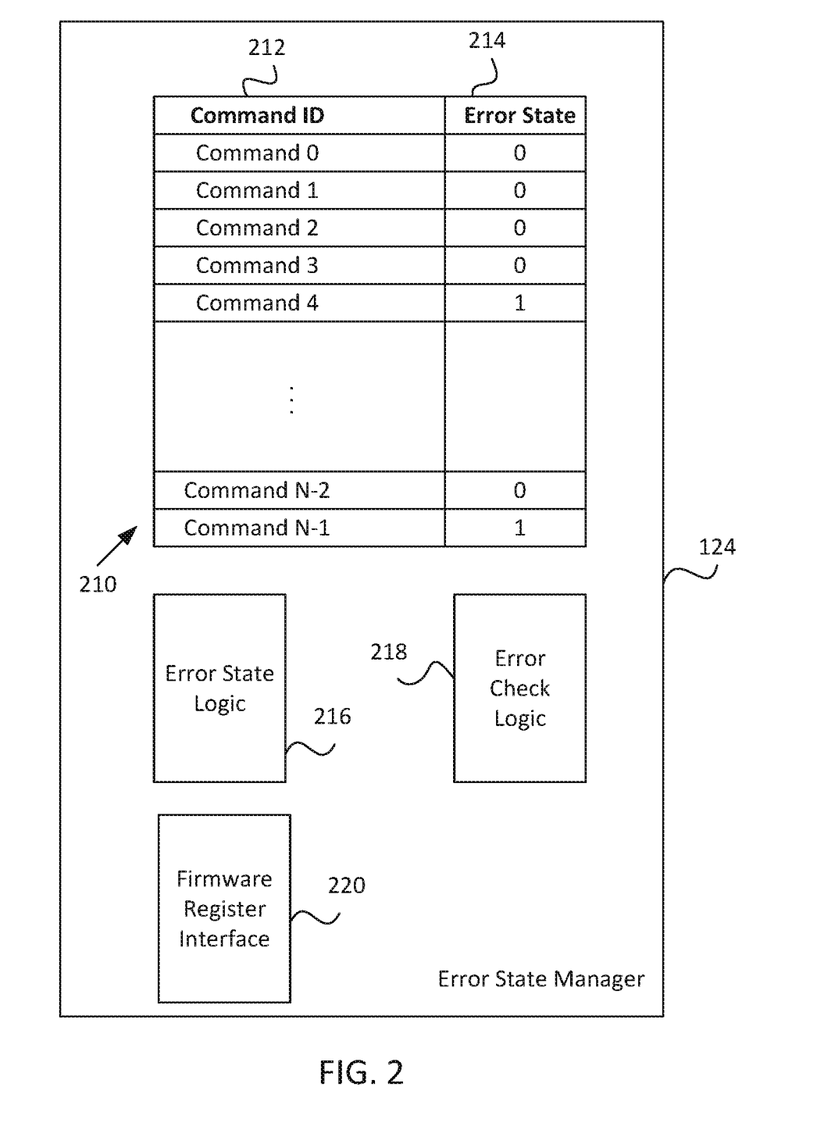
FIG. 2 is a diagram the error state manager of FIG. 1, according to one embodiment.

FIG. 2 is a diagram of the error state manager 124 of FIG. 1, according to one embodiment. Error state manager 124 includes but is not limited to an error state bitmap 210 having a command identifier (command ID) index 212 and an error state field 214, an error state logic 216, an error check logic 218, and a firmware register interface 220. Error state bitmap 210 includes a number of rows equal to the number (N) of possible command identifiers used in ASIC 100. An error state bit in error state field 214 represents the error state of each command. In the FIG. 2 embodiment, an error state bit with a logic value of "0" means that the command is not in error and an error state bit with a logic value of "1" means that the command is in error. In the FIG. 2 embodiment, command 4 and command N−1 have an error state of "in error." Error state manager 124 receives "command in error" state messages from error queue manager 122 to mark a command as being in error, where each message includes a command identifier. In another embodiment, error state manager 124 receive a "command in error" state message from any of hardware block A 112, hardware block B 114, hardware block C 116, and hardware block D 118 when that hardware block experiences an error in performing a task associated with a command identifier. Firmware register interface 220 enables firmware 120 to set the error state of a command. For example, firmware 120 may abort a command and set the error state of that command in error state bitmap 210 as being in error. In response to a "command in error" state message or a register write from firmware, error state logic 216 sets the error state bit in error state field 214 for the specified command identifier as being in error, for example by setting the bit to a logic value of "1." Error state manager 124 receives "clear error" messages from firmware 120 to mark the specified command as no longer being in error. In response to a "clear error" message, error state logic 216 sets the error state bit in error state field 214 for the command identifier specified in the "clear error" message as not being in error, for example by setting the bit to a logic value of "0."

Error state manager 124 is also configured to receive "check error" queries from hardware block A 112, hardware block B 114, hardware block C 116, and hardware block D 118 seeking the error state of a particular command. When error state manager 124 receives a query from one of hardware block A 112, hardware block B 114, hardware block C 116, or hardware block D 118, error check logic 218 reads the error state in error state field 214 for the command identifier specified in the query. Error check logic 218 then sends a response to the requesting hardware block that includes the command identifier and the current error state. This response enables the hardware blocks to avoid processing requests associated with commands reported to error queue manager 122 as being in error.

Figure 3:
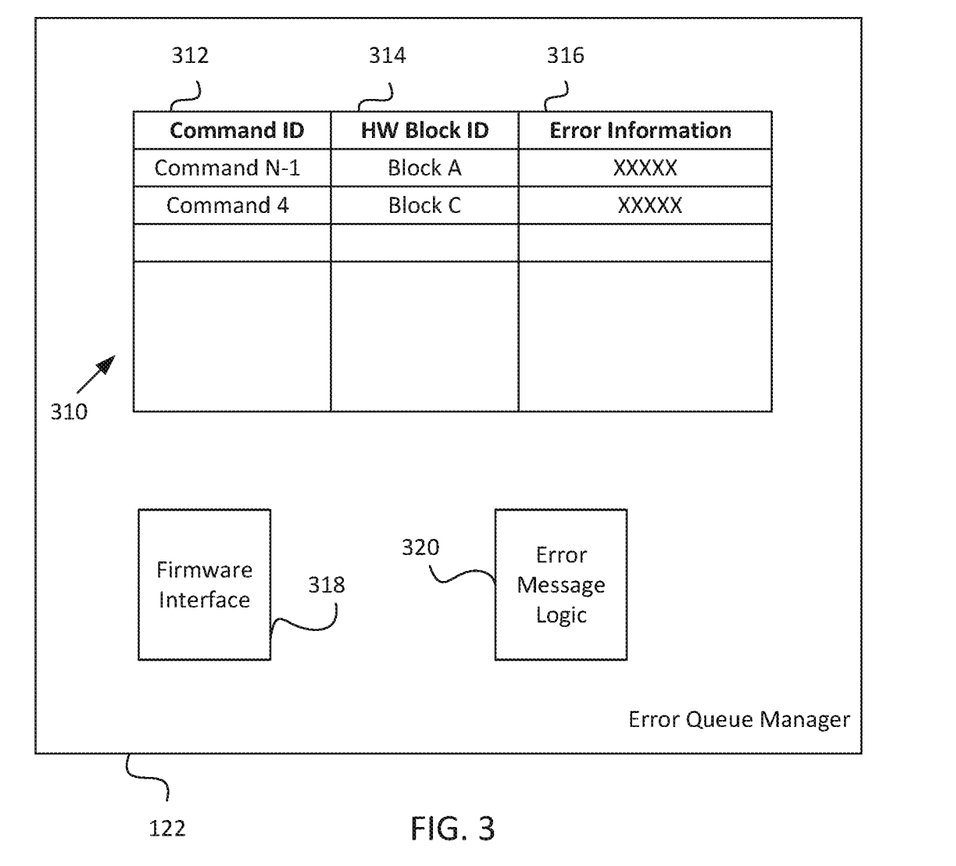
FIG. 3 is a diagram of the error queue manager of FIG. 1, according to one embodiment.

FIG. 3 is a diagram of the error queue manager 122 of FIG. 1, according to one embodiment. Error queue manager 122 includes but is not limited to an error queue 310, a firmware interface 318, and an error message logic 320. In the FIG. 3 embodiment, error queue 310 includes but is not limited to a command identifier field 312, a hardware block identifier field 314, and an error information field 316. Error queue manager 122 provides an error messaging interface between firmware 120 and each of hardware block A 112, hardware block B 114, hardware block C 116, and hardware block D 118. Error queue manager 122 receives an error message from a hardware block that experiences an error via error message logic 320. An error message includes a hardware block identifier for the hardware block that experienced the error, a command identifier of the command that is in error, and other error state information related to the command. The content and format of the error state information depend on the function performed by the hardware block that experienced the error. For example, a hardware block performing a direct memory access function will have different state information than a hardware block performing a numerical calculation function.

Error message logic 320 sends a "command in error" state message to error state manager 124 in response to an error message from a hardware block and stores the error message information in error queue 310. In one embodiment, each of hardware block A 112, hardware block B 114, hardware block C 116, and hardware block D 118 may communicate directly with error state manager 124 to set the error state of a command. In the FIG. 3 embodiment, error queue 310 shows that hardware block A 112 reported an error in handling a request related to a command N−1 and hardware block C 116 reported an error in handling a request related to a command 4. As shown in FIG. 2, command 4 and command N−1 have an error state of "1," command in error. Error message logic 320 stores error message information in error queue 310 in the order that the error messages were received. When an error message is moved to the top of error queue 310, firmware interface 318 sends an interrupt to firmware 120 to inform firmware 120 that a command has experienced an error, and firmware 120 will fetch the error information for that command from error queue manger 122. In one embodiment, error queue 310 is a buffer with a head and a tail. Error message logic 320 writes each received error message to the tail of error queue 310 and firmware 120 reads an error message from the head of error queue 310. After firmware 120 has processed an error message, firmware 120 writes to a head register (not shown) to update the location of the head in error queue 310. Firmware 120 performs a "cleanup" process in which it identifies resources in other hardware blocks that have been allocated to requests related to the command in error and instructs those hardware blocks to release those resources. Firmware 120 then handles the error information in any appropriate fashion, for example by reporting the error to a host system and/or resubmitting the command for execution.

Figure 4:
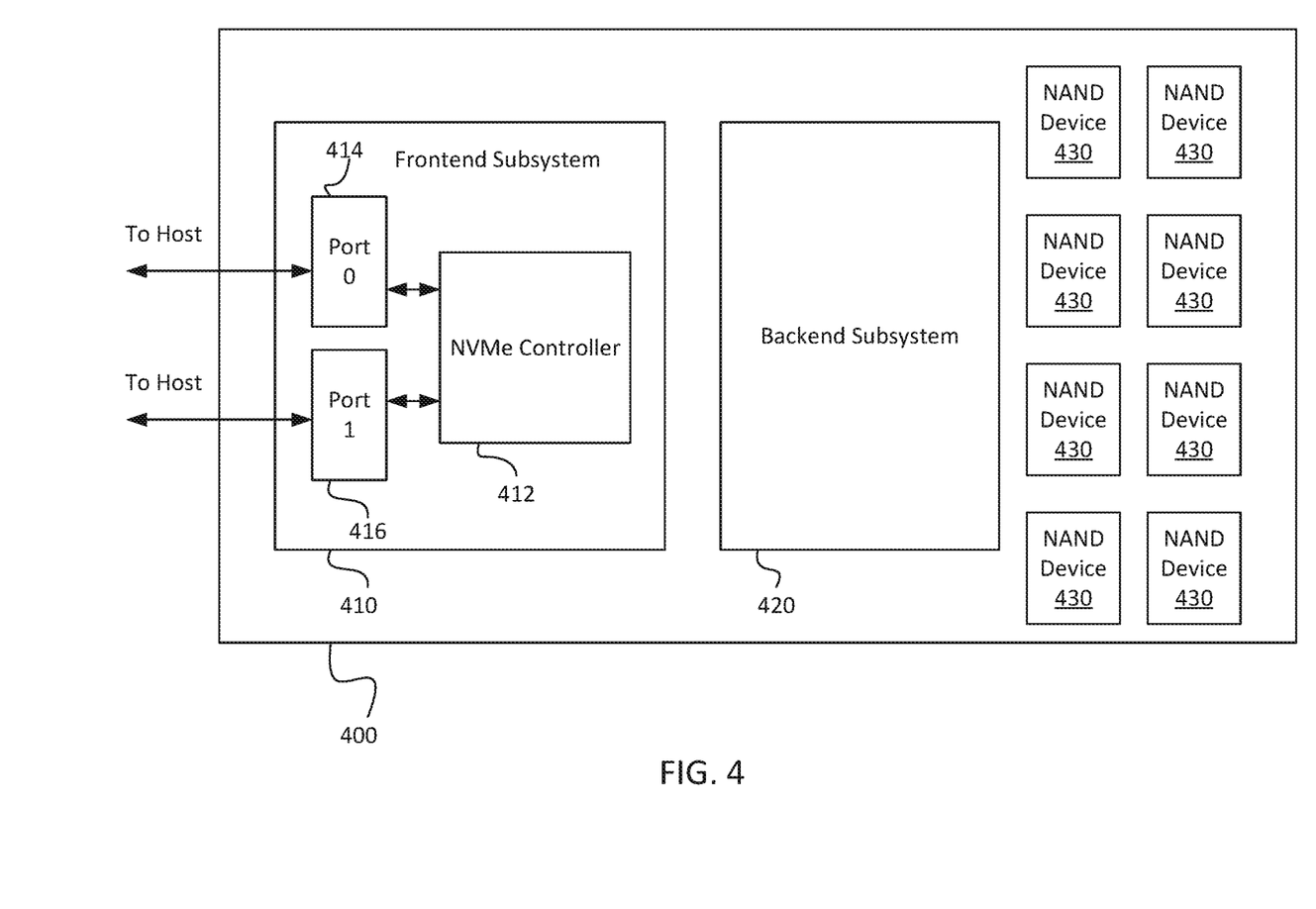
FIG. 4 is a diagram of a solid state storage drive including a controller with centralized error handling, according to one embodiment.

FIG. 4 is a diagram of a solid state storage drive 400 including a controller with centralized error handling, according to one embodiment. Solid state storage drive 400 includes, but is not limited to, a frontend subsystem 410, a backend subsystem 420, and a plurality of NAND flash memory devices 430. Frontend subsystem 410 includes two ports 414 and 416 that provide an interface with host systems (not shown) and backend subsystem 420 provides an interface with NAND flash memory devices 430. In the FIG. 4 embodiment, solid state storage drive 400 is a dual-host system where ports 414 and 416 interface with two separate host systems to receive commands and data and to output data read from NAND devices 430. An NVM express (NVMe) controller 412 in frontend subsystem 410 translates commands received from the host systems that comply with the NVMe standard into a set of requests for backend subsystem 420 to cause data to be read from or written to NAND devices 430.

Figure 5:
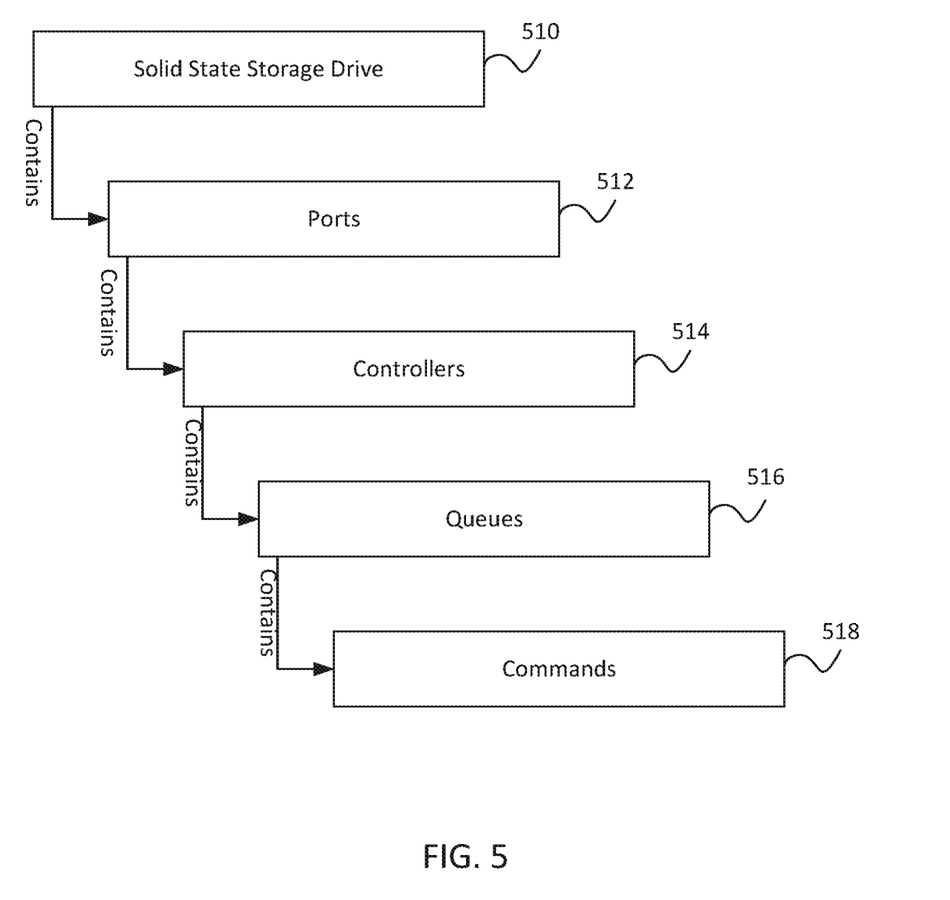
FIG. 5 is a diagram of a hierarchy of object tiers in a solid state storage drive, according to one embodiment.

FIG. 5 is a diagram of a hierarchy of object tiers in a solid state storage drive, such as solid state storage drive 400 of FIG. 4, according to one embodiment. The lowest tier of the hierarchy is a commands tier 518, where a command object is not a group or collection of any other type of object. A reset at command tier 518, for example an abort, affects only one particular command. The next higher tier of the hierarchy is a queues tier 516, where each queue is seen as a group or collection of commands. A reset at queues tier 516, for example a queue delete, will affect all commands having command identifiers currently associated with the particular queue being reset. The next higher tier of the hierarchy is a controllers tier 514, where each controller (real or virtual) is seen as a group or collection of queues. A reset at controller tier 514, for example a virtual function reset, will affect all queues associated with the particular controller being reset, and thus all of the commands currently associated with the affected queues.

The next higher tier in the hierarchy is a ports tier 512, where each port is seen as a group or collection of controllers. A reset at ports tier 512, for example a link down, will affect all controllers (real or virtual) assigned to the port being reset, all queues associated with the affected controllers, and all commands associated with the affected queues. The highest tier of the hierarchy is a solid state storage drive tier 510, where each system is seen as a group or collection of ports. A reset at drive tier 510, for example a power failure, affects all ports, all controllers, all queues, and all commands in the drive.

Figure 6:
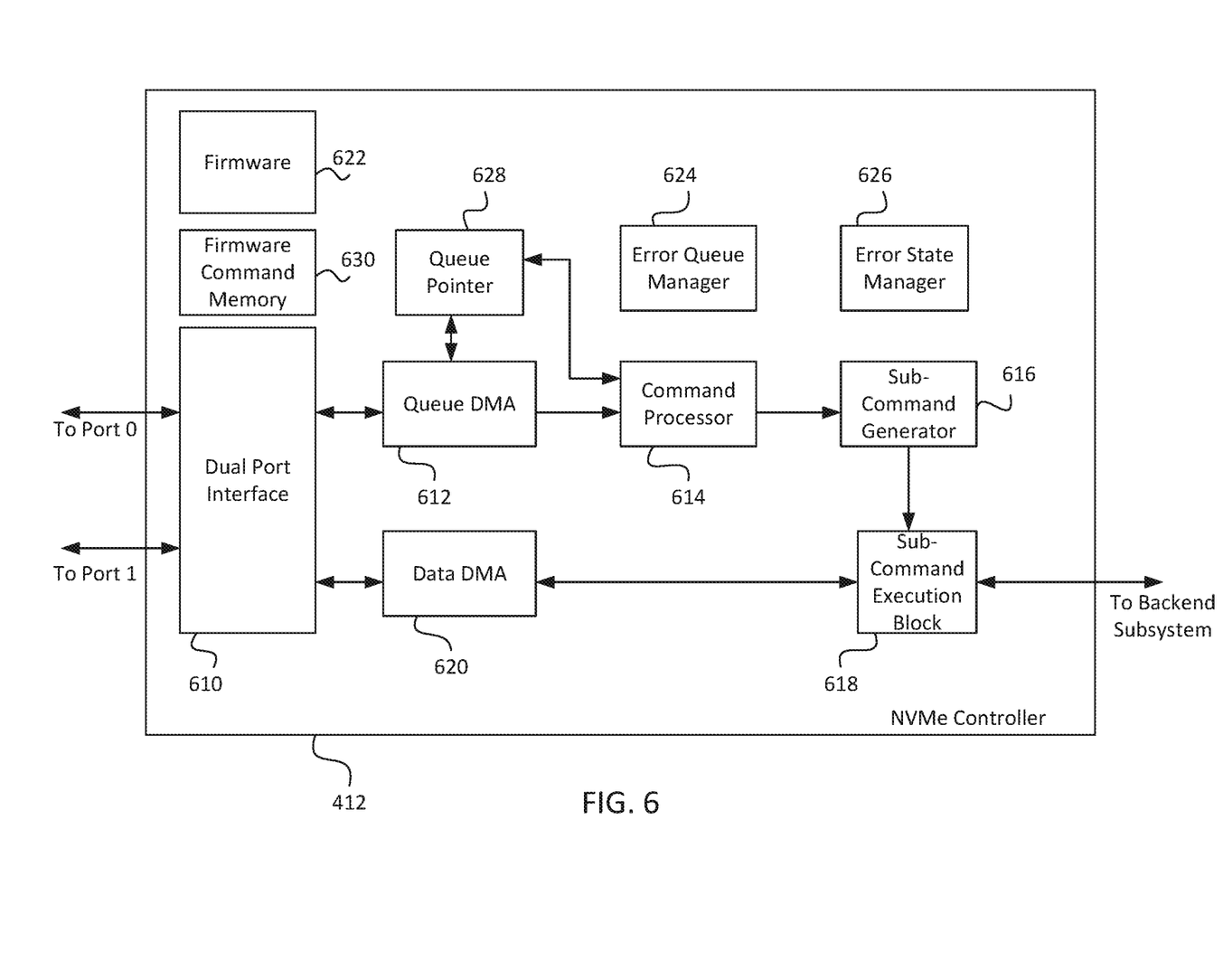
FIG. 6 is a diagram of the controller with centralized error handling of FIG. 4, according to one embodiment.

FIG. 6 is a diagram of NVMe controller 412 of FIG. 4, according to one embodiment. NVMe controller 412 is an ASIC that includes, but is not limited to, a dual port interface 610, a queue direct memory access (DMA) 612, a command processor 614, a subcommand generator 616, a subcommand execution block 618, a data DMA 620, a firmware 622, an error queue manager 624, an error state manager 626, a queue pointer 628, and a firmware command memory 630. Firmware 622 is executable code stored in a memory (not shown) that is executed by a processing unit (not shown) in conjunction with a volatile memory (not shown). Each of dual port interface 610, queue DMA 612, command processor 614, subcommand generator 616, subcommand execution block 618, data DMA 620, and queue pointer 628 is a hardware block configured to perform a specific task. Queue DMA 612 fetches host commands, such as read commands and write commands, through dual port interface 610 and sends the commands to command processor 614. Queue pointer 628 controls queue operation and queue arbitration, which is the process of selecting the order of fetching commands from host submission queues. Command processor 614 assigns a command identifier to each host command and sends the command and associated command header to firmware command memory 630. Firmware command memory 630 contains the command and the associated command header, both indexed by the command identifier, and is accessible by firmware 622. The command header includes a submission queue identifier that identifies the host submission queue from which the command was fetched.

Command processor 614 also sends the command with its assigned command identifier to subcommand generator 616, which generates a set of subcommands (or requests) for the command. For example, if the command is a read command calling for 32 KB of data to be read from NAND devices 430, subcommand generator 616 will generate a set of read subcommands where each subcommand is configured to cause a portion of the 32 KB payload to be read from one of NAND devices 430. In one embodiment, subcommand generator 616 is configured to generate subcommands having data payloads of 4 KB each. So for the exemplary read command calling for 32 KB of data, subcommand generator 616 will generate 8 subcommands that are associated with the command identifier for the read command. Each subcommand includes a data tag that identifies that subcommand. Subcommand generator 616 sends the subcommands to subcommand execution block 618, which executes the subcommands to cause backend subsystem 420 to perform operations such as reading data from NAND devices 430.

Subcommand execution block 618 uses the data tags to manage the processing of the subcommands. Subcommand execution block 618 sends data read from NAND devices 430 to data DMA 620, which provides the data to the requesting host system through dual port interface 610. Data DMA 620 also receives data to be written to NAND devices 430 from the host systems through dual port interface 610 and provides the data to subcommand execution block 618.

Upon receiving a request associated with a host command, each of command processor 614, subcommand generator 616, subcommand execution block 618, and data DMA 620 sends a query to error state manager 626 to ascertain the error state of the command associated with the request. Error state manager 626 includes an error state bitmap (not shown), and looks up the error state in the error state bitmap for the command identifier included in the query. Error state manager 626 responds to the query with a message including the current status of the error state for that command, either no error or in error. If error state manager 626 responds to the query that the command is not in error, the hardware block handles the request. If error state manager 626 responds to the query that the command is in error, the hardware block disregards the request and moves on to the next request.

If any of command processor 614, subcommand generator 616, subcommand execution block 618, and data DMA 620 experiences an error in handling a request associated with a host command, the block experiencing the error sends an error message to error queue manager 624. The error message includes an identifier of the hardware block, for example an identifier for command processor 614, the command identifier for the command that experienced the error, and other applicable error information. After sending the error message, the block that experienced the error releases all state for that request and proceeds to handling its next incoming request. Error queue manager 624 stores the information in each error message in an error queue (not shown) and sends a "command in error" state message to error state manager 626. In another embodiment, the block experiencing the error sends a "command in error" state message to error state manager 626. Error state manager 626 then sets the error state for the command identifier as being in error in the error state bitmap. Error queue manager 624 sends an interrupt to firmware 622 to inform firmware 622 that a message is available, and firmware 622 will fetch the error information for that command from error queue manager 624.

Firmware 622 deals with the error information as appropriate and will then release resources allocated to the command in error and report the error to the requesting host system if necessary. Firmware 622 identifies resources in other hardware blocks that have been allocated to requests related to the command in error and instructs those hardware blocks to release those resources. For example, firmware 622 will delete the command in error from an execution queue of command processor 614 and scan a data tag table of subcommand execution block 618 to identify any data tags associated with the command identifier of the command in error. Firmware 622 will then send instructions to data DMA 620 and subcommand execution block 618 to free all data tags associated with the command in error. Once all data tags associated with the command in error have been freed, firmware 622 instructs data DMA 620 to deallocate any residual data pointers associated with the command in error. When all resources related to the command in error have been released, firmware 622 sends a "clear error" message to error state manager 626 to change the error state of the command to "not in error." Firmware 622 may also instruct command processor 614 to mark the command identifier for the now-cleared command as available or free, such that the command identifier can be assigned to a new command received from the host systems. Alternatively, firmware 622 reports the error to the host system that issued the command. In one embodiment, firmware 622 sends a command completion message to a completion queue of the requesting host system, where the completion message includes an error code. Firmware 622 sending a completion message will also free the command identifier. In one embodiment, firmware 622 is configured to send command completion messages to a completion queue of the requesting host that comply with the NVMe protocol.

Firmware 622 can initiate a reset in response to a reset command from a host or declare a reset itself. A reset from a host may call for a reset of one or more commands, one or more queues, one or more controllers, one or more ports, or solid state storage drive 400 as a whole. Firmware 622 can declare a reset of one or more ports, one or more commands, one or more queues, or one or more controllers. For example, if one of port 414 or port 416 is physically uncoupled from its communication pathway to a host, firmware 622 will declare a reset of the affected port. For a reset or abort of one or more individual commands, firmware 622 performs a register write in error state manager 626 to mark the command(s) as being in error. Firmware 622 then releases resources allocated to the command(s) in error as set forth above.

For a reset of a queue or a collection of queues such as all queues associated with port 414, firmware 622 identifies the queues subject to the reset and instructs queue pointer 628 to halt fetching commands from the implicated queues. Firmware 622 marks the identified queues as being in error in command processor 614. In one embodiment, command processor 614 includes a queue error state bitmap (not shown) with an error state bit for each queue. When a queue is marked as being in error in the queue error state bitmap, command processor 614 sends any commands that are currently being fetched from the host to firmware 622 instead of to sub-command generator 616. By instructing queue pointer 628 to stop fetching commands from the implicated queue and by marking the queue as being in error in command processor 614, firmware 622 prevents additional new commands associated with the implicated queue from being processed for execution. Firmware 622 then temporarily halts the reuse or reallocation of command identifiers of completed commands by setting a pause_allocate flag in command processor 614. The pause_allocate flag is further described below in conjunction with FIG. 7.

Firmware 622 next identifies commands that have been allocated or assigned to the queues in error by scanning the listing of command headers, which is indexed by command identifier in firmware command memory 630. Each command header includes a submission queue identifier, and during the scan firmware 622 reads each command header and determines which command identifiers are currently allocated to the queue(s) in error. Firmware 622 then marks the commands currently allocated to the queue(s) in error as being in error in the error state bitmap in error state manager 626. As set forth above, the hardware blocks of NVMe controller 412 will request the error state of all commands associated with incoming subcommand requests from error state manager 626, and will ignore any requests that are reported as being associated with a command in error. After causing each command associated with the queue(s) in error to be marked as in error in the error state bitmap, firmware 622 clears the pause_allocate flag. Firmware 622 also clears the error state of the queue(s) in command processor 614, and instructs queue pointer 628 to resume fetching commands from the reset queue(s) if appropriate for a given reset type. Firmware 622 then performs the "cleanup" process to release resources allocated to each of the commands in error in the hardware blocks. As the cleanup process is completed for each command in error, firmware 622 sends a message to error state manager 626 to clear the error status of the appropriate command identifier in the error state bitmap.

Figure 7:
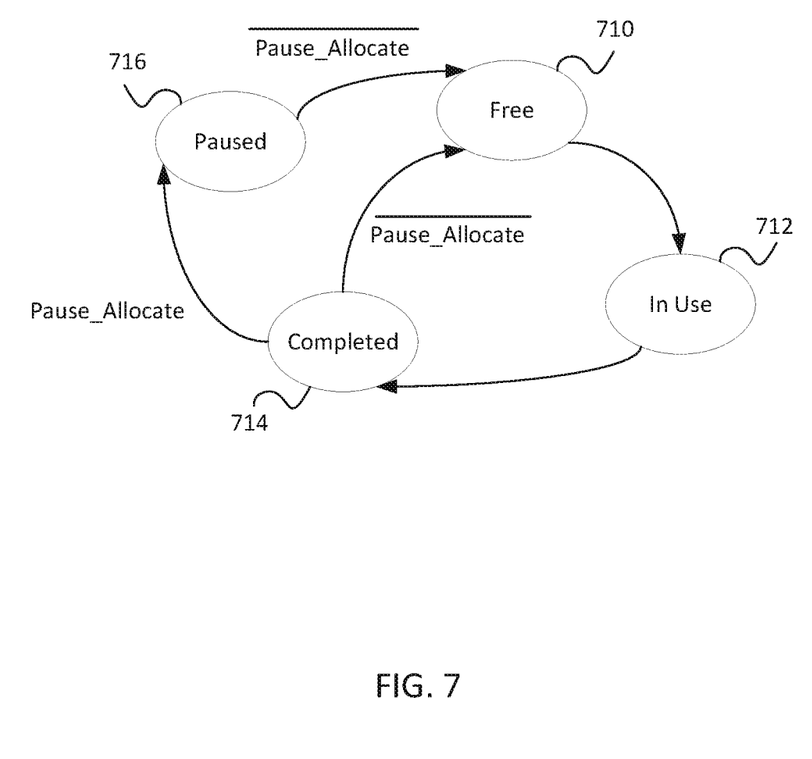
FIG. 7 is a diagram of states of a command identifier in the controller with centralized error handling of FIG. 4, according to one embodiment.

FIG. 7 is a diagram of states of a command identifier in NVMe controller 412 of FIG. 4, according to one embodiment. A command identifier in NVMe controller 412 can be in one of four possible states including a free state 710, an in use state 712, a completed state 714, and a paused state 716. In free state 710, the command identifier is available to be allocated or assigned by command processor 614 to a command received from a submission queue of one of the host systems. Upon being allocated to a command from a host by command processor 614, the command identifier transitions to in use state 712. When the command allocated to the command identifier has completed (e.g., the requested data has been read from NAND devices 430), the command identifier transitions to completed state 714.

From completed state 714, the command identifier transitions to free state 710 or to paused state 716 depending on whether firmware 622 has set a pause_allocate flag in command processor 614. If the pause_allocate flag is not currently set, then the command identifier transitions to free state 710, in which it is available to be allocated to a new command from a host. If the pause_allocate flag is currently set in command processor 614, then the command identifier transitions to paused state 716. When firmware 622 clears the pause_allocate flag, any command identifiers in paused state 716 transition to free state 710. Paused state 716 prevents a race condition in which command identifiers of completed commands subject to the reset enter free state 710 and are reallocated to new commands incoming from a host after firmware 622 has identified the commands that are subject to the reset. As set forth above, firmware 622 sets the pause_allocate flag while it scans the command headers to identify each command identifier associated with a queue in error. By temporarily halting the re-allocation of command identifiers from completed commands to incoming host commands, firmware 622 is able to identify and mark as errored command identifiers even for commands that have completed.

Figure 8:
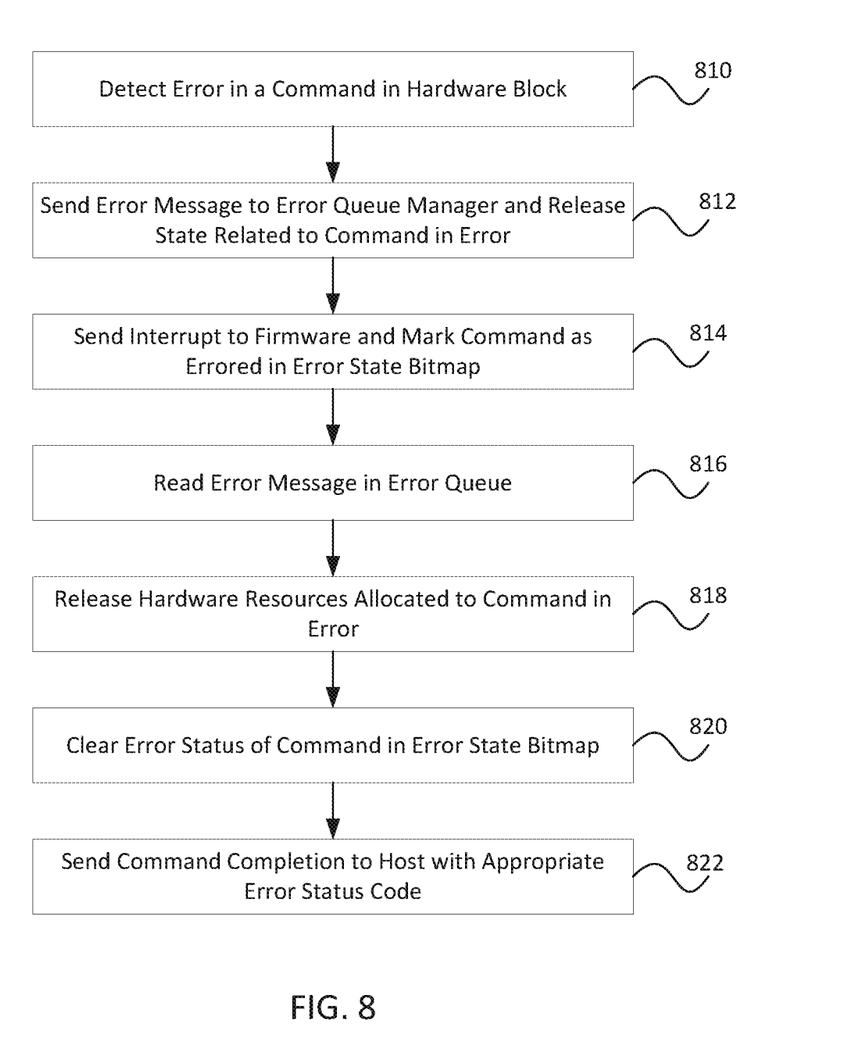
FIG. 8 is a flowchart of method steps for centralized error handling in an application specific integrated circuit, according to one embodiment.

FIG. 8 is a flowchart of method steps for centralized error handling in an application specific integrated circuit such as NVMe controller 412, according to one embodiment. In step 810, a hardware block, for example subcommand execution block 618 of NVMe controller 412 of FIG. 6, detects an error in a command being handled by that block. In a step 812, the hardware block experiencing the error sends an error message to error queue manager 624, the error message including a command identifier for the command in error, an identifier for the hardware block experiencing the error, and other error information. The format and content of the other error information will vary according to the function the hardware block experiencing the error is configured to perform. The hardware block experiencing the error also releases all state related to the command in error and then proceeds to handle the next incoming request. In step 814, error queue manager 624 sends an interrupt to firmware 622 to notify firmware 622 that an error has occurred and sends a "command in error" state message to error state manager 626, which sets the error state of the command in the error state bitmap as being in error. In another embodiment, the hardware block experiencing the error sends a "command in error" state message to error state manager 626. In one embodiment, error queue manager 624 sends an interrupt to firmware 622 when error queue manager 624 places a next error message at the head of the error queue. In step 816, firmware 622 reads the error message in the error queue of error queue manager 624. In a step 818, firmware 622 performs a "cleanup" process to release resources allocated to the command in error in other hardware blocks. One embodiment of this "cleanup" process is described below in conjunction with FIG. 9. When the cleanup process is complete, the method continues with step 820, in which firmware 622 sends a message to error state manager 626 to clear the error status of the command identifier in the error state bitmap. In other words, firmware 622 sends a "clear error" message to error state manager 626 to set the error status of the command identifier as being not in error. In step 822, firmware 622 sends a command completion message to a completion queue of the host system with an appropriate error status code.

Figure 9:
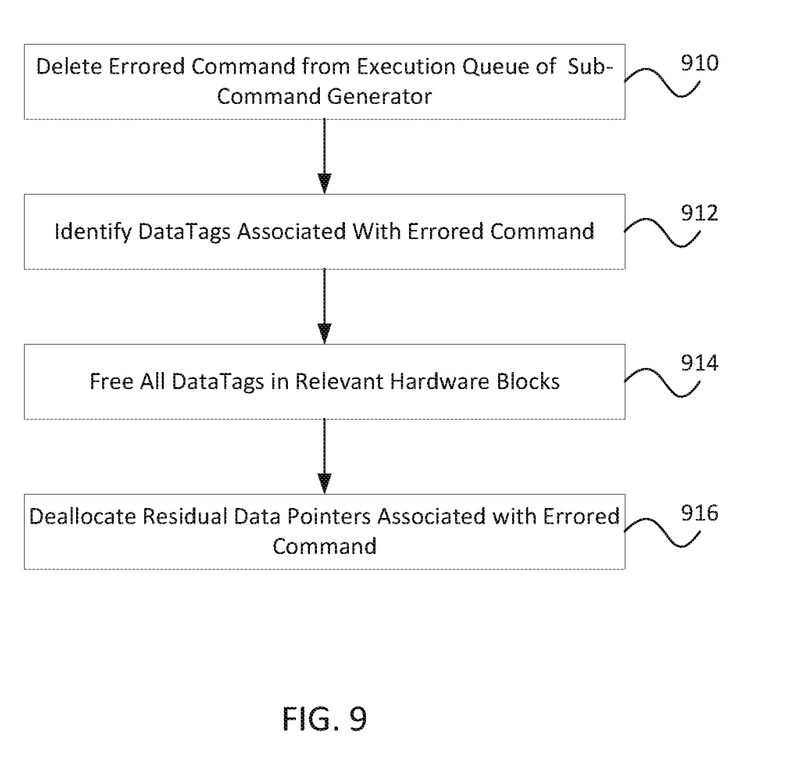
FIG. 9 is a flowchart of method steps for releasing hardware resources associated with an errored command, according to one embodiment.

FIG. 9 is a flowchart of method steps for releasing hardware resources associated with an errored command, according to one embodiment. In the FIG. 9 embodiment, firmware 622 performs a "cleanup" process to release hardware resource for a command that has experienced an error in one of the hardware blocks of NVMe controller 412 of FIG. 6. In step 910, firmware 622 deletes the errored command from the execution queue of subcommand generator 616. In step 912, firmware 622 identifies all data tags associated with the errored command by scanning a data tag table in subcommand execution block 618. In step 914, firmware 622 frees all the data tags associated with the errored command in the relevant hardware blocks. For example, firmware 622 instructs data DMA 620 and subcommand execution block 618 to free all data tags associated with the command in error. Once all data tags associated with the command in error have been freed, in step 916 firmware 622 instructs data DMA 620 to deallocate any residual data pointers associated with the errored command.

Figure 10:
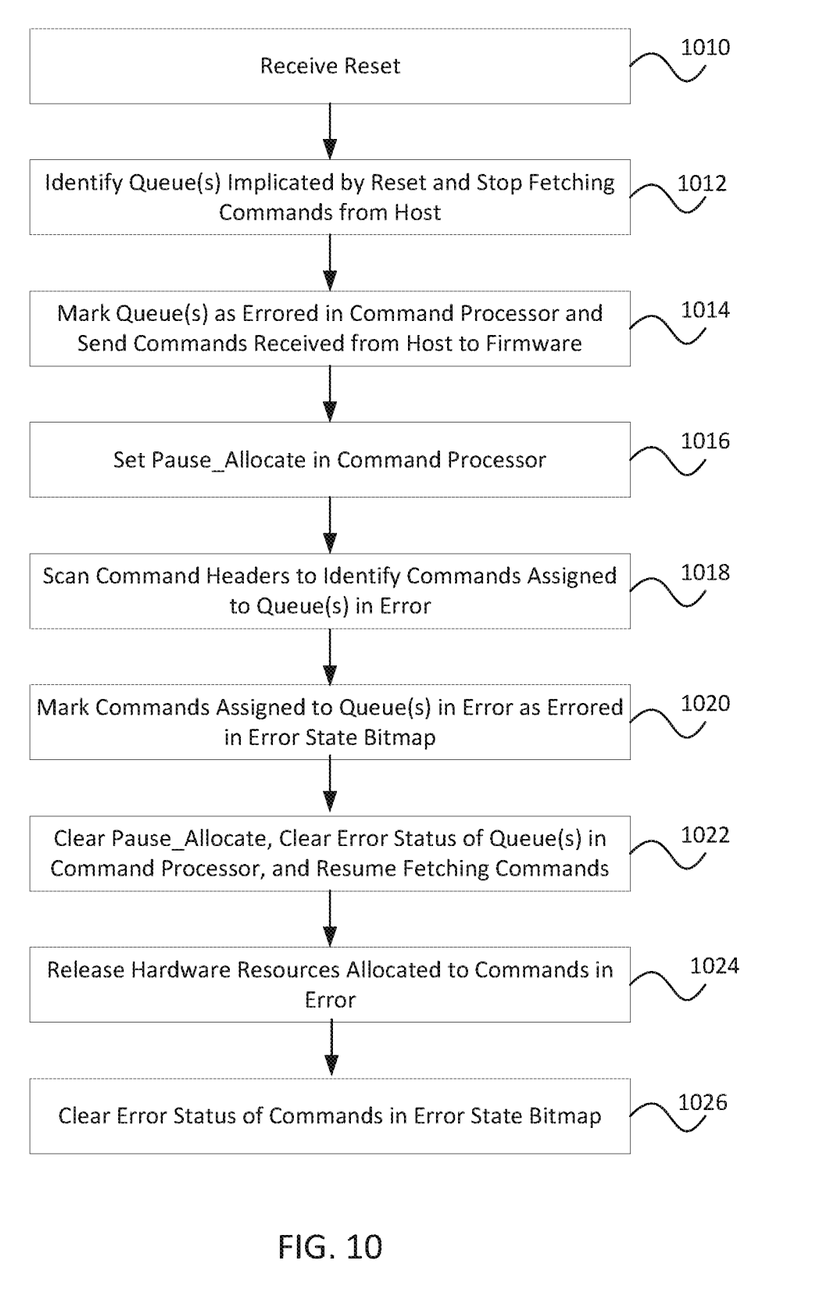
FIG. 10 is a flowchart of method steps for reset handling in an application specific integrated circuit, according to one embodiment.

FIG. 10 is a flowchart of method steps for reset handling in an application specific integrated circuit, according to one embodiment. In a step 1010, firmware 622 receives a reset notification, for example a reset command from a host communicatively coupled to port 414 of solid state storage drive 400 that identifies port 414 as being subject to the reset. In one embodiment, firmware 622 itself declares a reset of one or more ports, one or more controllers, or one or more queues. In a step 1012, firmware 622 identifies each queue subject to the reset and instructs queue pointer 628 to halt fetching commands from the implicated queue or queues in the host. To continue the above example of a port reset, firmware 622 identifies each submission queue associated with port 414 and instructs queue pointer 628 to halt fetching commands from those host submission queues.

In a step 1014, firmware 622 marks the identified queues as being in error the queue error state bitmap in command processor 614, and command processor 614 sends any commands currently being fetched from the host for the queues in error to firmware 622 instead of sub-command generator 616. In a step 1016, firmware 622 sets a pause_allocate flag in command processor 614 to temporarily halt the reallocation of command identifiers of completed commands to new commands received from a host. In a step 1018, firmware 622 scans the listing of command headers, which is indexed by command identifier, to identify command identifiers that have been allocated or assigned to the queues in error (i.e., queues subject to reset). To continue the above example of a port rest, firmware 622 scans the listing of command headers for the queues identified in step 1012 as being assigned to port 414 and identifies the command identifiers currently assigned to those queues. In a step 1020, firmware 622 marks the identified commands as being in error in the error state bitmap of error state manager 626. In a step 1022, firmware 622 clears the pause_allocate flag to resume reallocation of command identifiers of completed commands and instructs queue pointer 628 to resume fetching commands for the implicated queues. In a step 1024, firmware 622 performs a "cleanup" process to release resources allocated to each of the commands in error in the hardware blocks. One embodiment of this "cleanup" process is described above in conjunction with FIG. 9. When the cleanup process is complete for each command in error, the method continues with step 1026, in which firmware 622 sends a "clear error" message to error state manager 626 to clear the error status of the appropriate command identifiers in the error state bitmap.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A method for reset and error handling comprising:
   identifying at least one queue of a plurality of queues that is subject to a reset;
   halting fetching of commands from a host that are associated with the at least one queue subject to the reset;
   halting reallocation of command identifiers of completed commands to commands received from the host that are associated with the plurality of queues;
   identifying at least one command identifier associated with the at least one queue subject to the reset;
   updating an error state bitmap to indicate the at least one command identifier as a command in error;
   resuming reallocation of command identifiers of completed commands after updating the error state bitmap; and
   resuming fetching of commands from the host that are associated with the at least one queue subject to the reset after resuming reallocation of command identifiers of completed commands.

2. The method of claim 1, further comprising:
   identifying at least one resource associated with the at least one command identifier in at least one of a plurality of hardware blocks; and
   causing the at least one of the plurality of hardware blocks to release the at least one resource associated with the at least one command identifier.

3. The method of claim 2, further comprising updating the error state bitmap to indicate the at least one command identifier as command not in error when the at least one resource associated with the at least one command identifier has been released.

4. The method of claim 1, wherein halting reallocation of command identifiers of completed commands to commands received from host that are associated with the plurality of queues comprises setting a flag in a command processor, and resuming reallocation of command identifiers of completed commands to commands received from the host that are associated with the plurality of queues comprises clearing the flag in the command processor.

5. The method of claim 1, further comprising:
   setting a queue error state bit corresponding to a queue identifier of the at least one queue subject to the reset in a queue error state bitmap as queue in error prior to halting allocation of command identifiers; and
   setting the queue error state bit in the queue error state bitmap corresponding to the queue identifier of the at least one queue subject to the reset as queue not in error after resuming allocation of command identifiers.

6. The method of claim 1, further comprising
   reporting an error state of a command in response to a query from one of a plurality of hardware blocks;
   if the error state of the command is command in error, disregarding a request associated with the command by the one of the plurality of hardware blocks; and
   if the error state of the command is command not in error, performing a function in response to the request associated with the command by the one of the plurality of hardware blocks.

7. The method of claim 1, wherein updating the error state bitmap comprises setting an error state bit corresponding to the at least one command identifier as a command in error.

8. The method of claim 7, wherein setting the error state bit in the error state bitmap corresponding to the command identifier as command in error comprises a register write to an error state manager by firmware.

9. The method of claim 1, further comprising receiving a reset notification from a host to reset the at least one queue.

10. The method of claim 1, further comprising receiving a reset notification from a host to reset at least one port.

11. A system for reset and error handling comprising:
   a plurality of hardware blocks, each of the plurality of hardware blocks configured to perform a function in response to a request associated with a command;
   a queue pointer configured to control fetching of commands from a host, each command being associated with one of a plurality of queues;
   a command processor configured to allocate command identifiers to the commands received from the host that are associated with the plurality of queues; and
   firmware configured to
      identify at least one queue of the plurality of queues that is subject to a reset,
      cause the queue pointer to halt fetching of commands associated with the at least one queue subject to the reset,
      cause the command processor to halt reallocation of command identifiers of completed commands to commands associated with the plurality of queues,
      identify a command identifier of at least one command associated with the at least one queue subject to the reset, update an error state bitmap to indicate the at least one command associated with the at least one queue as a command in error, cause the command processor to resume reallocating command identifiers of completed commands after updating the error state bitmap, and cause the queue pointer to resume fetching of commands from the host that are associated with the at least one queue subject to the reset after causing the command processor to resume reallocation of command identifiers of completed commands.

12. The system of claim 11, wherein the command processor includes a queue error state bitmap, the queue error state bitmap storing a queue error state bit for each of a plurality of queue identifiers, the queue error state bit indicating either queue in error or queue not in error, and wherein the firmware is further configured to cause the command processor to set the queue error state bit for the at least one queue subject to the reset as queue in error.

13. The system of claim 11, further comprising an error state manager that includes the error state bitmap, and wherein the firmware is configured to update the error state bitmap by setting an error state bit for the at least one command identifier in the error state bitmap to indicate command in error.

14. The system of claim 13, wherein each of the plurality of hardware blocks is configured to send a query to the error state manager to determine the error state of a command prior to performing a function in response to a request associated with the command.

15. The system of claim 14, wherein each of the plurality of hardware blocks is configured to disregard a request to perform a function associated with a command in error.

16. The system of claim 11, further comprising an error queue manager configured to receive an error message from at least one of the plurality of hardware blocks and store the error message in an error queue, the error message including a command identifier of a command in error.

17. The system of claim 11, wherein the firmware is further configured to identify a resource in at least one of the plurality of hardware blocks allocated to a request including the command identifier of the at least one command associated with the at least one queue subject to the reset.

18. The system of claim 17, wherein the firmware is further configured to instruct the at least one of the plurality of hardware blocks to release the resource allocated to the request including the command identifier of the at least one command associated with the at least one queue subject to the reset.

19. The system of claim 18, wherein the firmware is further configured to update the error state bitmap for the command identifier of the at least one command associated with the at least one queue subject to the reset as command not in error when all resources allocated to the at least one command in the plurality of hardware blocks have been released.

20. The system of claim 11, wherein the firmware is configured to identify the at least one queue subject to the reset in response to a reset command from the host.

* * * * *